June 28, 1949.  H. R. BILLETER  2,474,720
TOOL-OPERATING ATTACHMENT
Filed Jan. 17, 1946  2 Sheets-Sheet 1

INVENTOR.
Henry Robert Billeter,
BY
Fidler & Crouse
Atty's

June 28, 1949.   H. R. BILLETER   2,474,720
TOOL-OPERATING ATTACHMENT
Filed Jan. 17, 1946   2 Sheets-Sheet 2
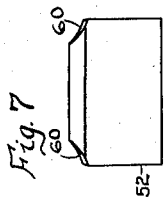
Fig. 7
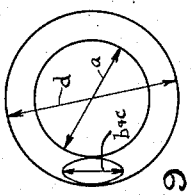
Fig. 9
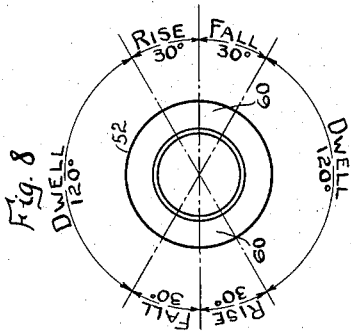
Fig. 8
Fig. 3
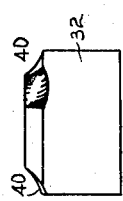
Fig. 2
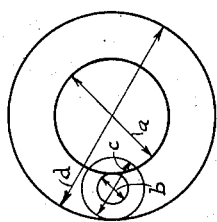
Fig. 4
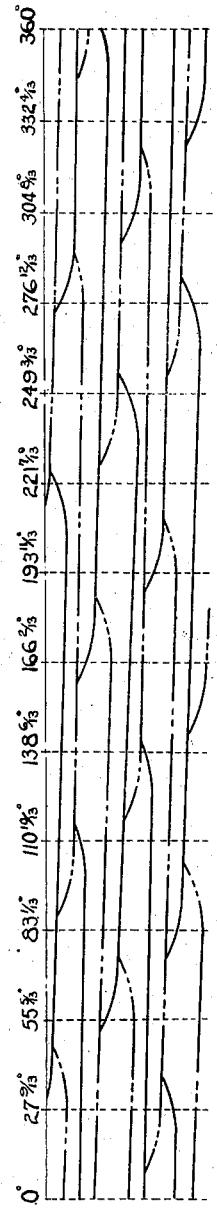
Fig. 5
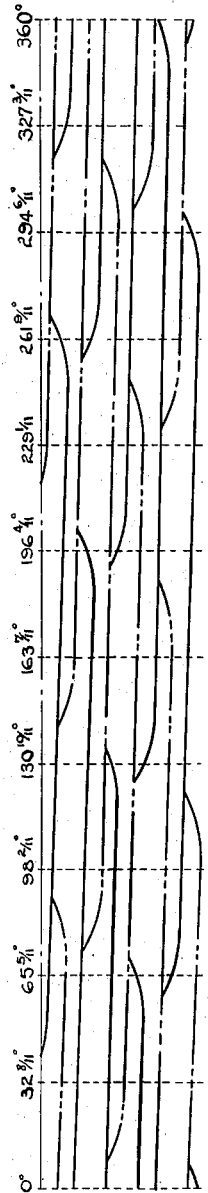
Fig. 10
INVENTOR.
Henry Robert Billeter
BY
Fidler + Crouse
Atty's.

Patented June 28, 1949

2,474,720

UNITED STATES PATENT OFFICE 2,474,720

TOOL-OPERATING ATTACHMENT

Henry Robert Billeter, Highland Park, Ill.

Application January 17, 1946, Serial No. 641,787

2 Claims. (Cl. 77—33)

This invention relates to an improved tool-operating attachment for machine tools, more particularly to an improved device for attachment to drill presses to operate twist drills in such manner as to regularly repeatedly interrupt the cut or cuts being made by the drill and so that material is removed from the work in the form of short chips which readily clear from the drill and work instead of in the form of long curled chips which not only may not readily clear from the drill and work but also interfere with the supply of coolant and cause some danger to the machine operator.

An object of the present invention is to provide an improved device of the character indicated above which is simple in construction, inexpensive of manufacture and has high durability.

A further object is to provide a twist drill operating attachment for drill presses and the like which will provide an improved cutting and chip-breaking action of the drill.

A further object of the invention is to provide a twist drill operating attachment for drill presses and the like which will regularly repeatedly interrupt the cut or cuts made by the drill in such relation to the rotation of the drill that the points of successive withdrawals and re-entries of the cutting edge or edges of the drill from and into the material of the work piece regularly progress around the axis of the drill-hole so as to eliminate the tendency of the drill to produce a skewed hole which frequently occurs when such successive points of withdrawal and re-entry of the cutting edges fall in a line or lines parallel to the axis of the drill-hole.

Two preferred structural embodiments of the invention are illustrated by way of example in the accompanying drawings in which:

Fig. 2 is an elevation of the lower ball bearing race which is carried by and rotates with the tool supporting spindle of the device of Fig. 1;

Fig. 3 is a top plan of the race of Fig. 2 showing the proportions and arrangement of the cam falls, rises and dwells thereof;

Fig. 4 is a schematic diagram illustrating the planetary gear characteristics of the bearing balls and races of the device of Fig. 1;

Fig. 5 is a schematic illustration of the cutting action of a conventional two-fluted spiral twist drill operated by the device of Fig. 1;

Fig. 7 is an elevation of the lower ball bearing race which is carried by and rotates with the tool carrying spindle of the modified device of Fig. 6;

Fig. 8 is a top plan of the race member of Fig. 7 showing the proportions and arrangement of the cam falls, rises and dwells thereof;

Fig. 9 is a diagram schematically illustrating the planetary gear action of the balls and races of the lower ball bearing of the device of Fig. 6; and Fig. 10 is a schematic illustration of the cutting action of a conventional two-fluted spiral twist drill operated through the device of Fig. 6.

Figure 1:
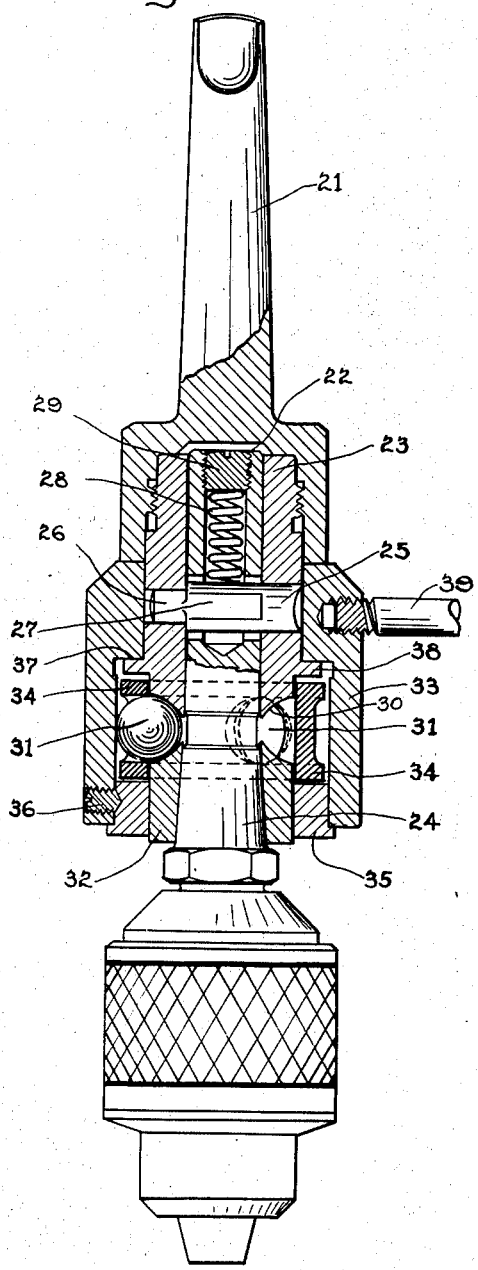
Figure 1 is a vertical and longitudinal section along the axis of one form of construction embodying the invention.

In the device of Fig. 1 the drive shank 21, which has a taper to fit the spindle of the drill press or other machine tool with which the device of the present invention is to be employed or is otherwise adapted for attachment to such spindle, is formed at its lower end with an internally threaded axially centered socket 22 into which is screwed the upper threaded end of a sleeve 23 having a centered axial bore which, in turn, receives the upper end portion of the tool spindle 24. A pin 25 passes through the sleeve 23 and spindle 24 and has a reduced cylindrical end portion 26 to fit a small radial bore in one side of the sleeve 23, a larger cylindrical head portion to fit the radial bore of larger diameter in the opposite side of the sleeve 23, and flattened side portions 27 intermediate its large and small cylindrical ends to fit closely the sides of vertically elongated radial slots in opposite sides of the spindle 24. A compression spring 28 contained in an axial bore in the upper end of the tool spindle 24 seats at its lower end against the pin 25 and is compressed by a plug 29 threaded into the upper end of the bore in the spindle 24, so that the spring 28 yieldingly urges the spindle 24 upwardly relative to the sleeve 23 and shank 21.

The lower end of the sleeve 23 is formed as one race 30 of a ball bearing comprising also the balls 31, a lower race member 32 and an outer race member 33 and a ball-spacing cage 34. The generally cylindrical lower race member 32, having a ball-race surface formed on its upper end, has an upwardly narrowing tapered or conical bore to fit a tapered portion of the spindle 24 whereby the lower race member 32 may be secured on the spindle 24 for rotation therewith. The outer race member 33 is formed with a lower cylindrical bore providing the outer race for the balls 31 and is adapted to receive, in its lower end, a closure ring 35 which has a flange to seat against the lower end of the member 33 and is suitably secured in place as by means of a set screw 36. The lower race and the ring 35 are formed with a running fit between them so as to close the lower end of the member 33 against the entrance of chips and dirt. The upper end of the stationary race member 33 has an axial cylinder bore of reduced diameter with an annular shoulder 37 between it and the lower larger bore in member 33. The shoulder 37 bears against an annular flange 38 formed on the sleeve 23 whereby the stationary race member 33 is held against vertical displacement between the annular flange 38 and the lower end of the shank 21. The race member 33 has a running fit with the flange 38, sleeve 23 and shank 21.

The stationary race member 33 has an outrigger rod 39 threaded radially onto it, said rod being adapted to engage against the drill press column or other stationary member of or on the machine to which the device is attached.

It will be apparent that as the shank 21 is driven during operation of the drill press or other machine, the sleeve 23 will rotate with the shank and, through the pin 25, will also drive the spindle 24. The spindle 24, sleeve 23 and shank 21 thus rotate as a unit but because of the vertical elongation of the radial slots in the spindle 24 through which the pin 25 passes the spindle 24 may move vertically a short distance relative to the sleeve 23 and shank 21. The spring 28 keeps the race 32 pressed tightly against the balls 31 and keeps the balls pressed tightly against the race 30 and race 33. It will be apparent that as the races 30 and 32 rotate in unison, the balls will be rotated on vertical axes as they roll on their equators on the stationary race 33 and on their 60° north and south parallels on the races 30 and 32, respectively. Obviously, the balls 31 will progress in their orbits around the interior of the stationary race 33 at a rate slower than the rotation of the races 30 and 32 rotating with the spindle 24.

In the device of Fig. 1 there are three balls 31 spaced 120° apart in three openings in the spacing member 34, and the race surface of the race member 32 has formed in it three equally spaced cam depressions 40, the proportions and arrangement of which are illustrated in Fig. 3 from which it will be seen that the fall portions of the cam depressions are of 20° extent, the rise portions are also of 20° extent, and the three equal dwell portions are each of 80° length. The shape of the cam depressions are such that vertical movement imparted to the lower race 32 and spindle 24 as the balls 31 roll into and out of the cam depressions during the rotation of the spindle 24 is of harmonic form.

The race surfaces of the members 30 and 32 are formed so that the curvature in the section is of a greater radii than the radii of the balls 31, so that the balls have substantially point contacts with the races 30 and 32, so that the track of the balls upon the races and vice versa will be substantially lines rather than areas. The contact or pitch line of the balls on the lower race departs only slightly from a complete circular form and only by reason of the depressions 40 formed in the race surface.

It will be apparent that the rate of progression of the balls 31 around their orbit relative to the rate of rotation of the spindle 24 will be determined by the pitch diameters of the various contact or track lines on the bearing parts in accordance with the principles of a planetary gear. The planetary gear effect of the ball bearing of the device of Fig. 1 is illustrated schematically in Fig. 4 in which $a$ is the diameter of the tracks of the balls 31 upon the race members 30 and 32; $b$ is the diameter of the track of the race 32 upon a ball 31; $c$ is the diameter of the track of the stationary outer race 33 upon the same ball 31; and $d$ is the diameter of the track of the balls 31 upon the stationary outer race 33. Thus it will be apparent that, as the lower race 32 rotates clockwise with the shank 21 and spindle 24 during the operation of the device, the balls 31 will progress clockwise in their orbit at a rate less than the rate of rotation of the race 32. Starting with the balls centered in the respective cam depressions 40, the rotation of the spindle 24 and races 30 and 32 will cause the balls to roll up out of the cam depressions, thus forcing the race 32, spindle 24 and the drill downward. Each time the spindle 24 rotates 120° farther than the balls 31 progress in their orbit, each of the three balls will again be centered the next following cam depressions 40 in the race 32. As the balls roll into the cam depressions 40, the spring 28, keeping the race 32 pressed tightly against the balls 31 will raise the spindle 24 and will lift the cutting edge or edges of the drill clear of the bottom of the drill hole, thus interrupting the cut and breaking the chip or chips. As the rotation of the drive shank 21, spindle 24 and drill continues, and the balls again roll up the rising sides of the depressions 40, the race 32, spindle 24 and drill are again forced downwardly to start a new cut which will continue until the spindle and race 32 have rotated far enough to cause the balls to roll into the next following depressions 40. This will happen repeatedly each time the spindle 24 and race 32 have rotated another 120° ahead of the balls 31.

The lengths of the cuts and frequency of the breaks in the chip resulting from a form of construction such as shown in Fig. 1 may be determined as follows:

Let $a$ = the pitch diameter of the race 32 rotating with the spindle;
$b$ = the diameter of the track of the rotating spindle race 32 on the ball 31;
$c$ = the diameter of the track of the stationary race 33 on the ball 31;
$d$ = the pitch diameter of the stationary race 33;
$e$ = the number of equally spaced cam depressions 40 as well as any whole number of times the number of rolling bearing elements 31;
$n$ = any whole number;
$r$ = one revolution or 360°;
$x$ = rotation of the spindle;
$y$ = the advance of the balls in their orbit; and
$z$ = rotation of the spindle race 32 in advance of the balls 31.

Then:

$$x = y + z \text{ (by definition)}$$

$$y = \frac{a}{b} \cdot \frac{c}{d} \cdot z$$

and $$x = \left(\frac{a}{b} \cdot \frac{c}{d} + 1\right) z$$

Starting with the balls centered in the cam depressions 40 in the race 32, the balls will again be centered in the cam depressions each time the rotating spindle 24 and the race 32 having the depressions 40 formed therein rotate ahead of the balls to the extent of $$\frac{r}{e}$$

i. e., whenever $$z = \frac{nr}{e}$$

and $$x = \left(\frac{a}{b} \cdot \frac{c}{d} + 1\right)\frac{nr}{e}$$

In a specific example of a construction of the form shown in Fig. 1, the pitch diameter of the race 32 is ⅞″, the internal diameter of the race 33 is 1⅝″, the diameter of the balls is ½″ and the diameter of the tracks made by the races 30 and 32 on the balls is ¼″. As there are three equally spaced balls 31 and three equally spaced depressions 40 in the race 32, $e$ is equal to three in that specific construction. With such dimensions, $$y = \frac{7/8}{1/4} \cdot \frac{1/2}{13/8} \cdot z = \frac{14z}{13}$$

and $$x = \frac{27z}{13}$$

so that the balls would be centered in the cam depressions 40 each time $z$, the rotation of the spindle 24 and race 32 in advance of the balls, became equal to $$\frac{360}{3} \text{ or } 120°$$

and $$x = \frac{27 \cdot 120°}{13} = 249 \tfrac{3}{13}°$$

or 9/13 of a revolution.

The foregoing calculations or estimates leave out of consideration the very slight lengthening of the circumference of the pitch circle of the race 32 caused by the depressions 40.

Fig. 5 illustrates schematically the cutting action of a standard two-fluted twist drill operated with the specific device just described. Starting with the balls 31 centered in the cam depressions 40, the first 3/26 or 41 7/13° of a revolution of the drive shank 21, spindle 24 and drill will roll the balls out of the cam depressions 40 to the beginning of the 80° dwells on the race 32. Assume that the consequent lowering of the drill causes the cutting edges thereof to enter the work material and start cutting. The cuts will progress normally with the normal feed during the next ⅔ of 249 3/13° or 166 2/13° of the rotation of the shank 21 and spindle 24 at which time the balls will be at the ends of the dwell portions of the cam race 32 and will enter the falling sides of the depressions 40 therein. During the next 41 7/13° of the rotation of the drill, the balls 31 will roll down the falling inclines of the depressions 40 permitting the spring 28 to lift the drill a distance corresponding to the depth of the depressions 40 less, however, the amount of normal feed which occurs during that portion of the rotation of the spindle 24. Assuming a normal feed less than the depth of the depressions 40, and in view of the fact that the drill has two cutting edges, the cutting edges will be gradually lifted clear of the work to interrupt the cuts and break off the chips before the rotation of the drill reaches the 249 3/13° point. During the next 41 7/13° of the rotation of the drill after it has passed the 249 3/13° point in its rotation, the balls will roll up the rising portions of the cam depressions 40 forcing the cutting edges of the drill back into the work prior to the time the rotation of the drill reaches the 263 1/13° point, after which the balls will roll on the 80° dwells and the cam race 32 and the drill will be advanced into the work by the normal feed and make another cut during the next 166 2/13° of rotation of the drill.

It will be seen that with the parts dimensioned as in the example given, the periodic alignments of the balls with the centers of the depressions 40 will occur, at each 249 3/13° of rotation of the drive shank 21, spindle 24 and the drill. In other words, starting with the balls in the centers of the depressions 40 the balls will again be centered in the depressions when the drill has rotated to 249 3/13°, to one revolution plus 138 6/13°, to two revolutions plus 27 9/13°, to two revolutions plus 276 12/13°, to three revolutions plus 166 2/13°, to four revolutions plus 55 5/13°, to four revolutions plus 304 8/13°, and so on.

These figures have been determined as though the work material offered no resistance to the cutting edges and did not react on the drill and the device driving it, and without taking into consideration any of the many variable factors such as the yielding of the various elements under stress during the cutting action. However, the figures so obtained will serve to show the nature of the cut-interrupting and chip-breaking action which is produced.

It will be apparent that the cutting edges are retracted as the balls 31 roll on the falling sides of the cam depressions 40 and, provided that the normal feed for a two-fluted spiral twist drill is less than twice the maximum depth of the cam depressions 40 where they intersect the pitch circle of the race 32, the cutting edges will be drawn out of the cut and the chip will be broken prior to the time the balls reach the centers of the depressions 40. Then as the balls roll up the rising sides of the cam depressions, the cutting edges of the drill are forced back into the work and commence the cutting of any chips prior to the time that the balls reach the top of the rises of the cam depressions.

The cutting action for a two-fluted spiral twist drill operated by a device according to Fig. 1 with the specific dimensions given above by way of example is illustrated schematically in Fig. 5 which is drawn as though the rotation of the drill started with the balls 31 centered in the depressions 40, and also on an assumption that the automatic feed is approximately equal to the depth of the depressions 40 so that the two cutting edges of the drill are brought into contact with the work when the balls 31 have rolled half way up the rising sides of the depressions 40. Fig. 5 also entirely omits consideration of all variable factors such as compression, torsion and other deformations of the various parts of the device, the tool operated thereby and the material of the work.

It will be seen that the successive withdrawals and re-entries of the cutting edges from and into the work occur at points which advance progressively around the axis of the hole being drilled in the work which prevents the repeated withdrawals and re-entries of the cutting edges from and into the material of the work from causing the hole being drilled to depart from the axis of the spindle of the machine as would be likely to occur if the beginnings and ends, respectively, of successive cuts were aligned parallel to the axis of the drill hole instead of in relatively flat spirals around the axis of the drill hole.

It will be apparent that if the parts were so dimensioned that the balls became centered in the depressions 40 upon each 180° of the rotation of the drive shank and drill the chip-breaking action would be lost altogether. If the centering of the balls in the depressions 40 occurred at each 360° of the rotation of the drive shank and tool, the withdrawal and re-entry of the cutting edges from and into the material of the work would recur at points vertically below those of the previous withdrawals and re-entries, respectively, so that any differences in the shapes or sharpness of the two cutting edges of the drill would tend to cause the drill hole to be diverted from the axis of the machine spindle. It will be seen that this same effect would be produced if the number of revolutions of the spindle which produced successive centerings of the balls 31 in the depressions 40 were equal to any multiple of the reciprocal of the number of cutting edges of the drill. However, by so dimensioning the parts as to produce the illustrated progression of the points of successive exits and re-entries of the cutting edges from and into the work material, such tendencies are eliminated.

Figure 6:
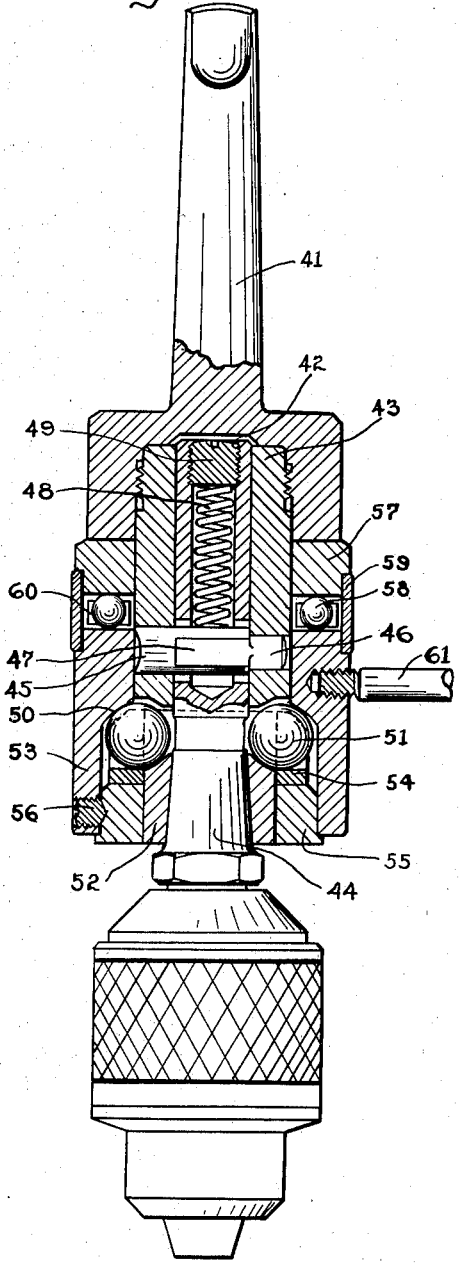
Fig. 6 is a section similar to Fig. 1 but of a modified form of construction also embodying the invention.

Fig. 6 shows a second form of construction embodying the invention wherein the drive shank 41 may be the same as the drive shank 21 of Fig. 1. The sleeve 43 of Fig. 6 is also like the sleeve 23 of Fig. 1 except that its lower end is not formed as a race for the balls 51. Whereas in the device of Fig. 1, the feed pressure is transmitted from shank 21 through the sleeve 23 and thence through the balls 31 to the race 32 and spindle 24 in the device of Fig. 6 the feed pressure is transmitted from the drive shank 41 to a collar 57, and then through the bearing balls 58 to the stationary race member 53 which is formed with the race 50 through which the feed pressure is transmitted through the balls 51 to the race member 52 on the spindle 44. A sleeve 59 surrounds the adjacent ends of the collar 57 and stationary race member 53 to exclude dirt from the balls 58 and the races on which they rotate, the balls being held properly spaced by suitable spacing member 60.

In the device of Fig. 6 there are two balls 51 which are held 180° apart by the spacing cage 54 and the race member 52 is accordingly formed with two cam depressions 60 centered 180° apart in the race formed on the upper end of the member 52. The points of contact of the races 50 and 52 on the balls 51 are displaced 30° from the vertical on opposite sides so that the balls rotate on axes displaced 30° from the horizontal and both races track on the equators of the balls.

It will be readily apparent that the device of Fig. 6 operates on the same principle as the device of Fig. 1 as already described. While the planetary gearing principle of the balls 51 and races 59 and 52 of the device of Fig. 6 is slightly different from the arrangement in the device of Fig. 1 because, as illustrated in Fig. 9, both races 50 and 52 track on the equators of the balls 51, the method of calculating the action of the device of Fig. 1 is also applicable to the device of Fig. 6 it being only necessary to give both of the elements b and c the value of the diameter of the balls 51. Accordingly, it will be found that starting with the balls 51 centered in the depressions 60, they will again be centered in the depressions 60 upon each 294°6/11° or 9/11 of a rotation of the drive shank 41 and drill. The action imparted to the cutting edges of a two-fluted twist drill, will as illustrated in Fig. 10, be essentially similar to the action illustrated in Fig. 5 and have the same advantages.

As shown in Figs. 3 and 8, the formation of the depressions 40 and 60 in the race portions of the members 32 and 52 is such that the depressions occupy 1/3 of the pitch circumference of the race, whereas the dwells occupy the remaining 2/3 of the pitch circumference. In the two devices illustrated, the rises and falls of the cam depressions are equal and symmetrical so that the rises and falls each individually occupy 20° of the pitch circumference of the race 32 but 30° of the pitch circumference of the race 52. However, the depressions may be of any desired form except that the rises and falls should not be inclined so steeply that the tangent of the angle of inclination at any point exceeds the coefficient of friction between the balls and the race in which the cam depressions 40 or 60 are formed. The depth of the cam depressions 40 and 60 at their centers should be a little greater than the product of the maximum anticipated feed per revolution and the number of cuts which the tool makes per revolution (two in the case of a double fluted spiral twist drill).

It will be readily apparent that in the device of Fig. 6 the cam depressions may be formed in either of the two races 50 or 52. In the device of Fig. 1, the cam depressions could be formed in any one of the three races 30, 33, or 32, though the action is somewhat better when the depressions 40 are formed either in the race 32 or in the race 30 rather than in the race 33. In the latter case it would be apparent that the balls would repeatedly be squeezed out from between the races 30 and 32 and again forced between those two races to spread them apart, as the balls 31 roller into and out of depressions formed in the stationary race 33. This would cause a sliding of the balls upon the races 30 and 32 which would tend to produce some wear. However, it will be seen that such wear would not occur at any localized points on either race because the rate of progression of the balls around the races is such that the successive entries of the balls 51 into the cam depressions occurs at progressively displaced points around the circumference of the races.

It will also be seen that in place of the ball bearings 30, 31, 32, 33 or 50, 51, 52, bearings having other forms of rolling elements may be employed. The number of balls or other rolling elements of the bearing is preferably equal to the number of cam depressions 40 or 60 but the number of such cam depressions may be any whole multiple of the number of balls or other rolling elements, the latter number being suited to the desired frequency of interruption of the cut or cuts made by the tool.

It is also apparent that the invention, instead of being constructed in the form of an attachment for a machine tool, may be built directly into the machine tool itself. So, for example, when incorporating the invention in an otherwise conventional drill press, the drive shank, designated 21 and 41 in the herein disclosed attachments, may be omitted, the lower end portion of the drill press spindle may be formed to serve the functions of the sleeve 23 or 43, and the drill press quill may be formed to serve as the non-rotatable race 33 or 53, or a stationary race like the race 33 or 53 may be formed as a separate member secured to the quill. Alternatively and more simply, the usual feed-pressure transmitting bearing between the drill press spindle and quill may be replaced by a bearing like the bearing 50, 51, 52, 60 of Fig. 4 or by a bearing functioning in the manner of the bearing 30, 31, 32, 33 of Fig. 1 or 50, 51, 52, 60 of Fig. 4.

From the foregoing, it will be apparent that the invention may be embodied in structures varying in various respects from the structures illustrated in the accompanying drawings and that by variously dimensioning the balls, races and cam depressions substantially any desired type of action of the tool operated by the device may be secured. Also, in place of the illustrated conventional three jaw chucks illustrated, the attachment may be provided with other forms of tool holding means. Various other modifications of structural form and detail may be made within the scope of the invention.

From the above descriptions of the structure and mode of operation, it will be apparent that the progression of the chip-breaking action of the drill around the periphery of the hole being drilled results from the structural arrangement wherein the rolling element is caused to move around the fixed race an angular amount different from its angular movement relative to the rotating race during any given period of operation. The fact that those relative angular movements are unequal results in the rolling element meeting the depression in the one race at times when the rolling element has moved an angular distance about the fixed race that is not a simple factor of the angular movement relative to the rotating race. In the specific embodiment shown, that difference in angular movement results primarily from the fact that the rolling element contacts the races at respectively different distances from the axis of the spindle. Other modifications will be readily apparent to those skilled in the art after studying the disclosures herein.

I claim:

1. In a chip breaking drill operating means having a rotatable spindle, a rotatable bearing race on said spindle and a non-rotating race arranged about said spindle, a rolling bearing element between said races in rolling contact therewith and a surface irregularity in one of said faces to be engaged by said element to retract a drill from a work piece; the improvement comprising, said races and element being so constructed and arranged that said element engages said races at respectively different effective distances from the axis of said spindle whereby successive engagements of said element with said surface irregularity occur at angularly displaced positions about the axis of said spindle.

2. In a chip breaking drill operating means having a rotatable spindle, a rotatable bearing race on said spindle and a non-rotating race arranged about said spindle, a rolling bearing element between said races in rolling contact therewith and a surface irregularity in one of said races to be engaged by said element to retract a drill from a work piece, the improvement wherein the diameters of the circles of contact between said element and races are so related that rotation of said element on its axis of rotation will cause said element to have an angular movement about said non-rotating race different from its angular movement relative to said rotatable race whereby successive engagements of said element with said surface irregularity occur at angularly displaced positions about the axis of said spindle.

HENRY ROBERT BILLETER.

REFERENCES CITED

The following references are of record in the file of this patent:

UNITED STATES PATENTS

| Number | Name | Date |
|---|---|---|
| 1,196,656 | Bugbee | Aug. 29, 1916 |
| 1,523,629 | Bulloch | Jan. 20, 1925 |
| 2,391,463 | Kingsbury | Dec. 25, 1945 |
| 2,430,019 | Jenkins | Nov. 4, 1947 |

Certificate of Correction

Patent No. 2,474,720 June 28, 1949

HENRY ROBERT BILLETER

It is hereby certified that errors appear in the printed specification of the above numbered patent requiring correction as follows:

Column 3, line 10, for the word "cylinder" read *cylindrical*; column 4, lines 66 and 67, for $$y\frac{a}{b}\cdot\frac{c}{d}\cdot z \qquad \text{read} \qquad y=\frac{a}{b}\cdot\frac{c}{d}\cdot z$$

column 5, line 35, for "2493/13°" read *249-3/13°*; column 8, line 38, for "roller" read *rolled*; column 10, line 5, for "faces" read *races*; and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*